United States Patent
Mears

(10) Patent No.: US 8,162,265 B2
(45) Date of Patent: Apr. 24, 2012

(54) AIRFOIL WING SYSTEM FOR INFLATABLE AIRFOILS

(76) Inventor: Tony W. Mears, Longmont, CO (US)

( * ) Notice: Subject to any disclaimer, the term of this patent is extended or adjusted under 35 U.S.C. 154(b) by 278 days.

(21) Appl. No.: 12/583,901

(22) Filed: Aug. 27, 2009

(65) Prior Publication Data

US 2010/0264270 A1 Oct. 21, 2010

Related U.S. Application Data

(63) Continuation-in-part of application No. 12/462,085, filed on Jul. 29, 2009, which is a continuation-in-part of application No. 12/386,232, filed on Apr. 15, 2009.

(51) Int. Cl.
*B64C 31/06* (2006.01)

(52) U.S. Cl. ............ 244/153 R; 244/142; 244/145; 244/155 A

(58) Field of Classification Search .......... 244/30–33, 244/155 A, 153 R, 145, 152, 142
See application file for complete search history.

(56) References Cited

U.S. PATENT DOCUMENTS

| 2,925,971 | A | * | 2/1960 | Istel et al. | 244/145 |
| 4,634,080 | A | * | 1/1987 | McNally | 244/13 |
| 5,174,529 | A | * | 12/1992 | Jalbert | 244/145 |
| 5,248,117 | A | * | 9/1993 | Hennings | 244/152 |

OTHER PUBLICATIONS

Sky-Dockfloatograph Technologies LLC./ Sky-Doc Balloons Images, Feb. 5, 2005, (http://web.archive.org/web/20050205022328/http://www.skydocballoon.com/images/).*

* cited by examiner

*Primary Examiner* — Timothy D Collins
*Assistant Examiner* — Jamie S Stehle
(74) *Attorney, Agent, or Firm* — Emery L. Tracy

(57) ABSTRACT

An airfoil wing system for releasing air from an airfoil wing for an inflatable airfoil is provided. The airfoil wing is secured to the inflatable airfoil. The airfoil wing system has at least two wing panels connected together and an opening formed between the two wing panels wherein the opening automatically moves from a closed position to an open position to release air from beneath the airfoil wing thereby allowing takedown of the inflatable airfoil.

20 Claims, 4 Drawing Sheets

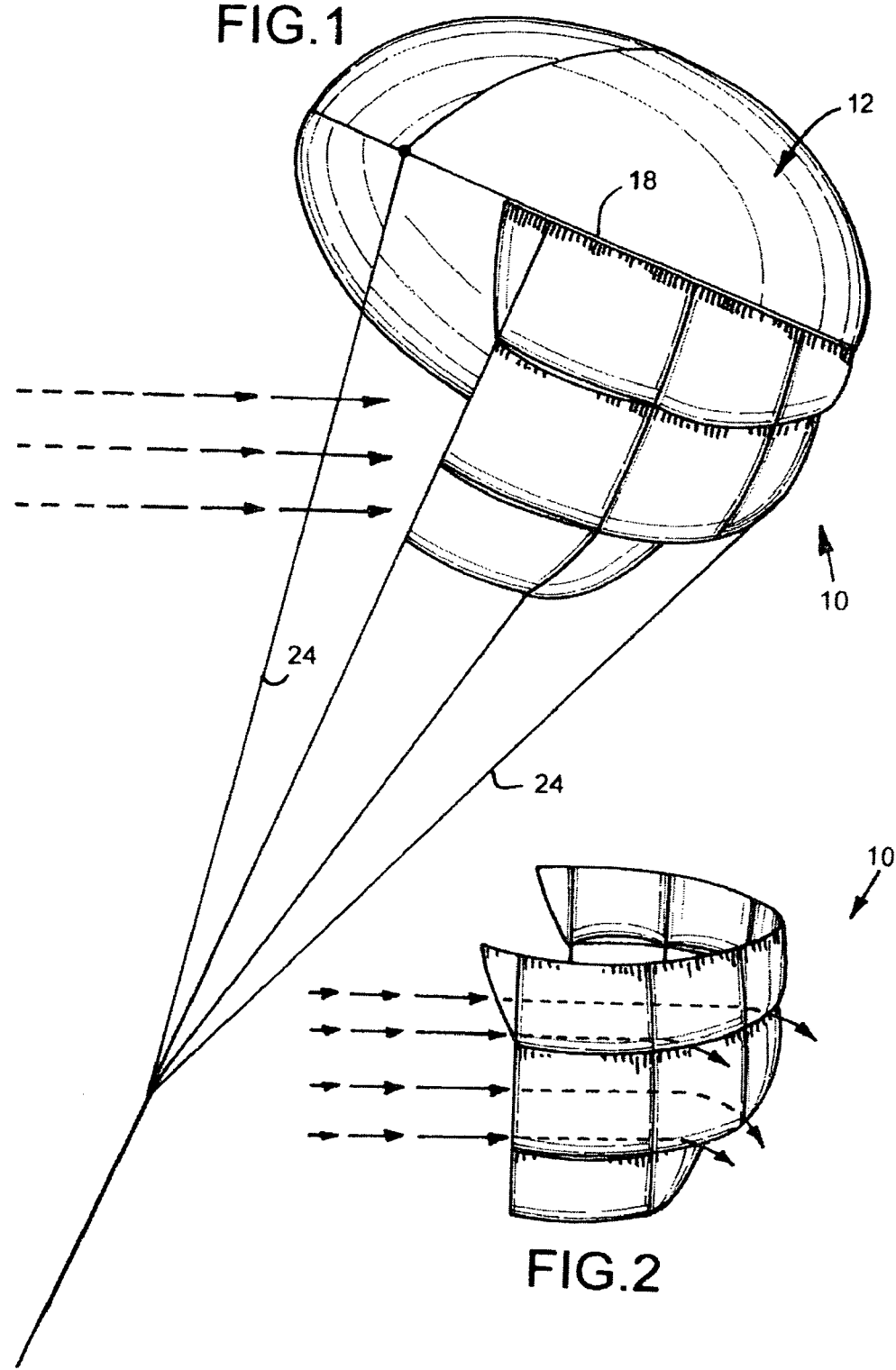

AIRFOIL WING SYSTEM FOR INFLATABLE AIRFOILS

The present application is a continuation-in-part of pending U.S. patent application Ser. No. 12/462,085, filed on Jul. 29, 2009, entitled "High Wind Release Vent for Inflatable Airfoils", which is a continuation-in-part of pending U.S. patent application Ser. No. 12/386,232, filed on Apr. 15, 2009, entitled "Adjustable Wing Line Apparatus for Inflatable Airfoils".

BACKGROUND OF THE INVENTION

1. Field of the Invention

This invention relates generally to an airfoil wing system for inflatable airfoils and, more particularly, the invention relates to an airfoil wing system for inflatable airfoils assisting in a controlled flight of the inflatable airfoil and allowing venting an airfoil wing during high wind conditions during flight.

2. Description of the Prior Art

There are numerous inflatable devices for providing location information; however, these devices are cumbersome, are not simple to operate, will not fly under windy conditions, are driven to the ground in high wind conditions, have no maneuverability, and are dangerous to bring back to the ground in a controlled manner. MacFadden, U.S. Pat. No. 3,395,877, claims a aerodynamically stable site marker balloon capable of being tethered under adverse flight condition. However, although MacFadden may fly where the spherical balloon will not, MacFadden will not fly and in fact will be driven to the ground in high wind conditions.

Schnee, U.S. Pat. No. 4,768,739, requires at least a light wind and has significant drawbacks in high winds as it would drag the individual. It claims the kite use as a sail. The Schnee device would be totally unusable in winds having velocity exceeding 20 miles per hour whereas the within invention will fly with wind velocity up to 80 miles per hour. Bringing the Schnee device to the ground during heavy winds can be a difficult if, if not impossible, task.

Accordingly, there exists a need for an airfoil wing system for an inflatable airfoil allowing release of air from an airfoil flight to stabilize the inflatable airfoil during flight. Additionally, a need exists for an airfoil wing system for an inflatable airfoil wherein the openings in the airfoil wing automatically release air from within the airfoil wing to maximize flight and stability of the inflatable airfoil. Furthermore, there exists a need for an airfoil wing system for an inflatable airfoil wherein the airfoil wing is a para wing comprised of multiple wing panels allowing further control over the flight of the inflatable airfoil.

SUMMARY

The present invention is an airfoil wing system for releasing air from an airfoil wing for an inflatable airfoil provided. The airfoil wing is secured to the inflatable airfoil. The airfoil wing system comprises at least two wing panels connected together and an opening formed between the two wing panels wherein the opening automatically moves from a closed position to an open position to release air from beneath the airfoil wing thereby allowing takedown of the inflatable airfoil.

In addition, the present invention includes an airfoil wing system for releasing air from an airfoil wing for an inflatable airfoil. The airfoil wing is secured to the inflatable airfoil. The airfoil wing system comprises a plurality of wing panels divided into a plurality of vertical columns and a plurality of horizontal rows with each adjacent wing panel connected to each other adjacent wing panel and a plurality of openings with each opening formed between two adjacent wing panels and extending along the entire length of the connection between the wing panels wherein each opening automatically moves from a closed position to an open position to release air from beneath the airfoil wing thereby allowing takedown of the inflatable airfoil.

The present invention further includes a method for releasing air from an airfoil wing for an inflatable airfoil. The airfoil wing is secured to the inflatable airfoil. The method comprises providing a plurality of wing panels, dividing the wing panels into a plurality of vertical columns and a plurality of horizontal rows, connecting each adjacent wing panel to each other adjacent wing panel, forming a plurality of openings, forming each opening between two adjacent wing panels, extending each opening along the entire length of the connection between the wing panels, moving each opening from a closed position to an open position, and releasing air from beneath the airfoil wing.

BRIEF DESCRIPTION OF THE DRAWINGS

FIG. 1 is a perspective view illustrating an airfoil wing system, constructed in accordance with the present invention, for inflatable airfoils with openings formed in an airfoil wing allowing release of air from the airfoil wing to stabilize the inflatable airfoil during flight;

FIG. 2 is a perspective view illustrating the airfoil wing of the airfoil wing system, constructed in accordance with the present invention, for inflatable airfoils with the airflow contacting the wing and at least some of the airflow being directed though the openings in the airfoil wing;

DETAILED DESCRIPTION OF THE PREFERRED EMBODIMENTS

As illustrated in FIGS. 1 and 2, the present invention is an airfoil wing system, indicated generally at 10, for an inflatable airfoil 12 allowing release of air from an airfoil wing 14 to stabilize the inflatable airfoil 12 during flight. Used in conjunction with the adjustable wing line apparatus described in U.S. patent application Ser. No. 12/386,232, incorporated by reference, or without the adjustable wing line apparatus 14, the airfoil wing system 10 provides stability of the inflatable airfoil 12 in all flight conditions, especially during high wind conditions. In addition, the airfoil wing system 10 of the present invention allows air to escape from beneath the airfoil wing 14 thereby allowing the user to safely bring the inflatable airfoil 12 down to the ground even in high wind conditions. It should be noted that references to the ground and lines extending to the ground can be attached to devices that are located on or above the ground itself.

Figure 3:
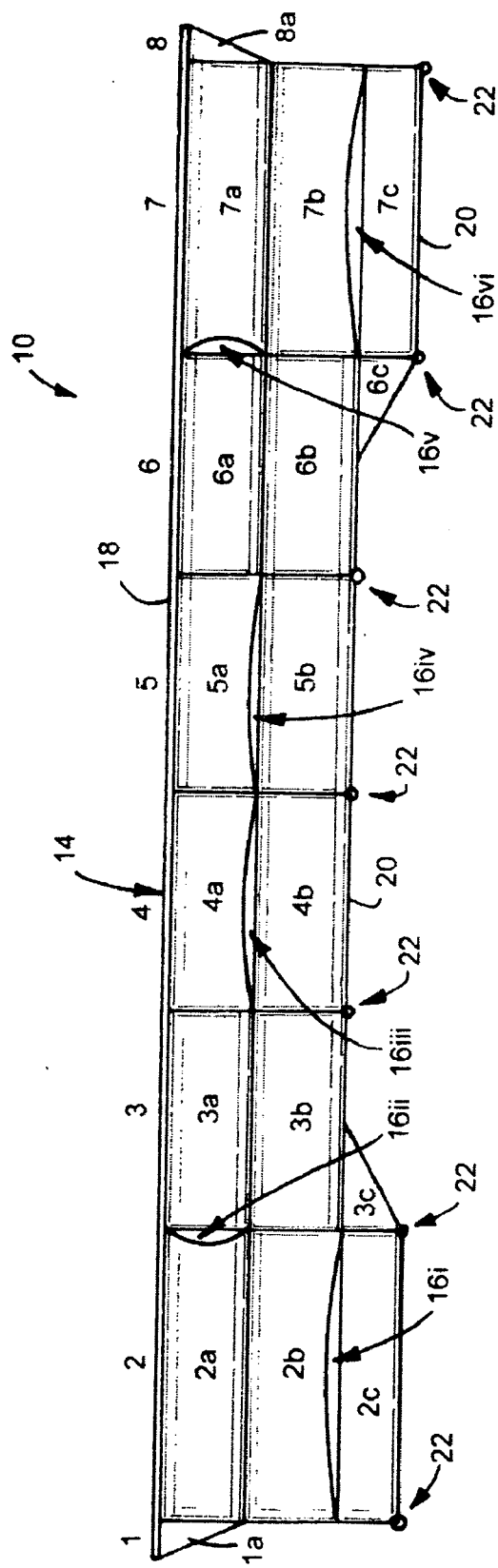
FIG. 3 is a rear view illustrating the airfoil wing of the airfoil wing system, constructed in accordance with the present invention, for inflatable airfoils with openings in the wing and harness line securement points.

The airfoil wing 14 of the airfoil wing system 10 of the present invention has at least two wing panels in a vertical column and/or a horizontal row. Preferably, the airfoil wing 14 has a plurality of wing panels divided into a plurality of vertical columns and a plurality of horizontal rows. Furthermore, the airfoil wing 14, in a preferred embodiment as best illustrated in FIG. 3, has eighteen (18) wing panels divided into eight (8) columns 1-8 and three (3) rows a-c although having more or less wing panels divided into more or less columns and/or more or less rows is within the scope of the present invention.

The first column 1 of the airfoil wing 14 of the airfoil wing system 10 of the present invention has a single left end wing panel 1a. In a preferred embodiment, the single left end wing panel 1a has a substantially triangular shape although constructing the single left end wing panel 1a with a different shape is within the scope of the present invention.

The second column 2 of the airfoil wing 14 of the airfoil wing system 10 of the present invention has three wing panels 2a, 2b, 2c with the wing panel 2a connected to the wing panel 2b and the wing panel 2b connected to the wing panel 2c. The single left end wing panel 1a is connected to the wing panel 2a creating a first row a. In a preferred embodiment, each of the wing panels 2a, 2b, 2c has a substantially rectangular shape although constructing the wing panels 2a, 2b, 2c with different shapes is within the scope of the present invention.

The third column 3 of the airfoil wing 14 of the airfoil wing system 10 of the present invention has two wing panels 3a, 3b, 3c with the wing panel 3a connected to the wing panel 3b and the wing panel 3b connected to the wing panel 3c. The wing panel 3a is connected to the wing panel 2a in the first row a, the wing panel 3b is connected to the wing panel 2b creating a second row b, and the wing panel 3c is connected to the wing panel 2c creating a third row c. In a preferred embodiment, each of the wing panels 3a, 3b has a substantially rectangular shape and the wing panel 3c has a triangular shape although constructing the wing panels 3a, 3b, 3c with different shapes is within the scope of the present invention.

The fourth column 4 of the airfoil wing 14 of the airfoil wing system 10 of the present invention has two wing panels 4a, 4b with the wing panel 4a connected to the wing panel 4b. The wing panel 4a is connected to the wing panel 3a in the first row a and the wing panel 4b is connected to the wing panel 3b in the second row b. In a preferred embodiment, each of the wing panels 4a, 4b has a substantially rectangular shape although constructing the wing panels 4a, 4b with different shapes is within the scope of the present invention.

The fifth column 5 of the airfoil wing 14 of the airfoil wing system 10 of the present invention has two wing panels 5a, 5b with the wing panel 5a connected to the wing panel 5b. The wing panel 5a is connected to the wing panel 4a in the first row a and the wing panel 5b is connected to the wing panel 4b in the second row b. In a preferred embodiment, each of the wing panels 5a, 5b has a substantially rectangular shape although constructing the wing panels 5a, 5b with different shapes is within the scope of the present invention.

The sixth column 6 of the airfoil wing 14 of the airfoil wing system 10 of the present invention has two wing panels 6a, 6b, 6c with the wing panel 6a connected to the wing panel 6b and the wing panel 6b connected to the wing panel 6c. The wing panel 6a is connected to the wing panel 5a in the first row a and the wing panel 6b is connected to the wing panel 5b in the second row b. In a preferred embodiment, each of the wing panels 6a, 6b has a substantially rectangular shape and the wing panel 6c has a substantially triangular shape although constructing the wing panels 6a, 6b, 6c with different shapes is within the scope of the present invention.

The seventh column 7 of the airfoil wing 14 of the airfoil wing system 10 of the present invention has three wing panels 7a, 7b, 7c with the wing panel 7a connected to the wing panel 7b and the wing panel 7b connected to the wing panel 7c. The wing panel 7a is connected to the wing panel 6a in the first row a, the wing panel 7b is connected to the wing panel 6b in the second row b, and the wing panel 7c is connected to the wing panel 6c in the third row c. In a preferred embodiment, each of the wing panels 7a, 7b, 7c, has a substantially rectangular shape although constructing the wing panels 7a, 7b, 7c with different shapes is within the scope of the present invention.

The eighth column 8 of the airfoil wing 14 of the airfoil wing system 10 of the present invention has a single right end wing panel 8a. The single right end wing panel 8a is connected to the wing panel 7a in the first row a. In a preferred embodiment, the single right end wing panel 8a has a substantially triangular shape although constructing the single right end wing panel 8a with a different shape is within the scope of the present invention.

In an embodiment of the airfoil wing system 10 of the present invention, the wing panels are secured together along the entire length of the connection between two adjacent wing panels. The securement of the adjacent wing panels can be accomplished by sewing, welding, adhesive, or other securement means. Between at least one pair of adjacent wing panels, there is an opening 16. The opening 16 can be any length, but is preferably the entire length of the connection between the adjacent wing panels. As best illustrated in FIG. 2, the opening 16 between at least one pair of adjacent wing panels allows air to escape from beneath the airfoil wing 14 for better controlling the flight and take down of the inflatable airfoil. Typically, each opening 16 is formed by the absence of any sewing or other securement means along the connection between the two adjacent wing panels. It should be noted that the number of openings 16 can vary depending on the wind conditions, height of flight, and desires of the user.

In a preferred embodiment of the airfoil wing system 10 of the present invention, there are six openings 16 formed in the airfoil wing 14. The first opening 16i is formed in the second column 2 between the wing panel 2b and the wing panel 2c. The second opening 16ii is formed in the first row a between the wing panel 2a and the wing panel 3a. The third opening 16iii is formed in the third column 3 between the wing panel 3a and the wing panel 3b. The fourth opening 16iv is formed in the fourth column 4 between the wing panel 4a and the wing panel 4b. The fifth opening 16v is formed in the first row a between the wing panel 6a and the wing panel 7a. The sixth opening 16vi is formed in the seventh column 7 between the wing panel 7b and the wing panel 7c. It should be noted that the openings 16 described and illustrated herein have been determined by the inventor to provide optimum control of the inflatable airfoil. Once again, however, it is within the scope of the present invention for the airfoil wing 14 to have more than six openings 16 or less than six openings 16 with the openings 16 positioned between other adjacent wing panels.

The airfoil wing 14 of the airfoil wing system 10 of the present invention has a connecting edge 18 and is secured to the inflatable airfoil 12 along the connecting edge 18. The connecting edge 18 is formed by the connection of wing panels 1a, 2a, 3a, 4a, 5a, 6a, 7a, 8a. The connecting edge 18 can be secured to the inflatable airfoil 12 using an adhesive material or other means, depending on the desires of the manufacturer or user. In addition, preferably, the connecting edge 18 has reinforcement tape providing additional strength to the connecting edge 18. Preferably, the tape extends beyond the connecting edge 18. It should be noted that each of the multiple columns 1-8 extend from the connecting edge 18.

Figure 4:
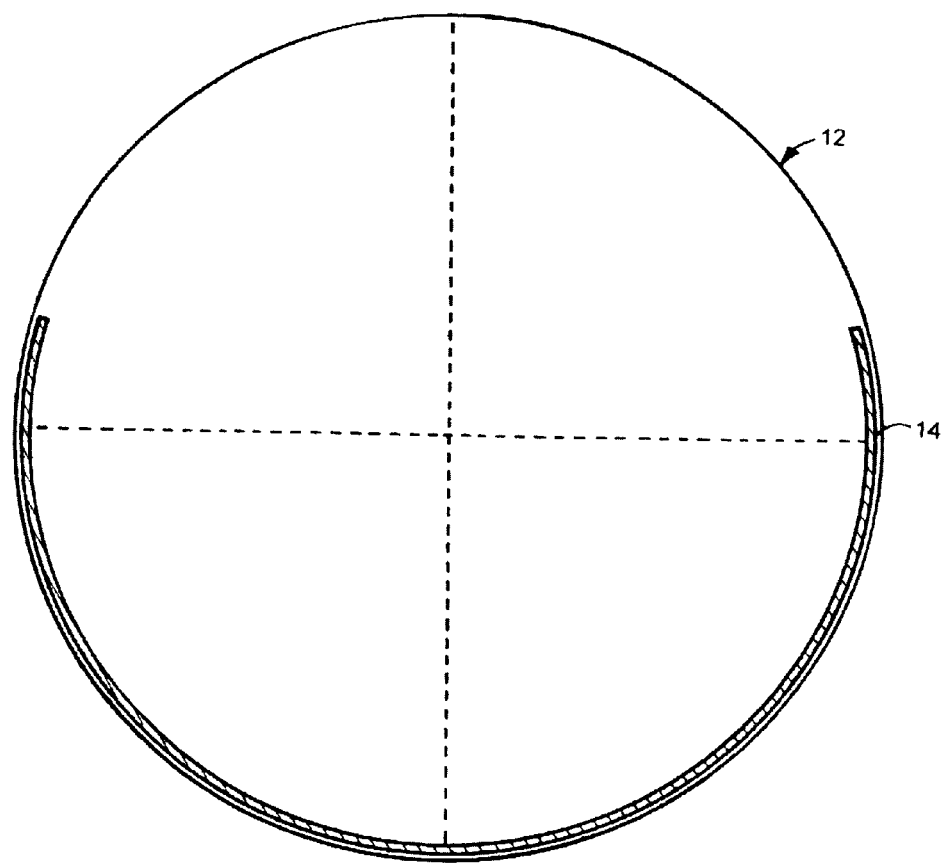
FIG. 4 is a bottom plan view illustrating airfoil wing attachment location on the inflatable airfoil of the airfoil wing system, constructed in accordance with the present invention.
Figure 5:
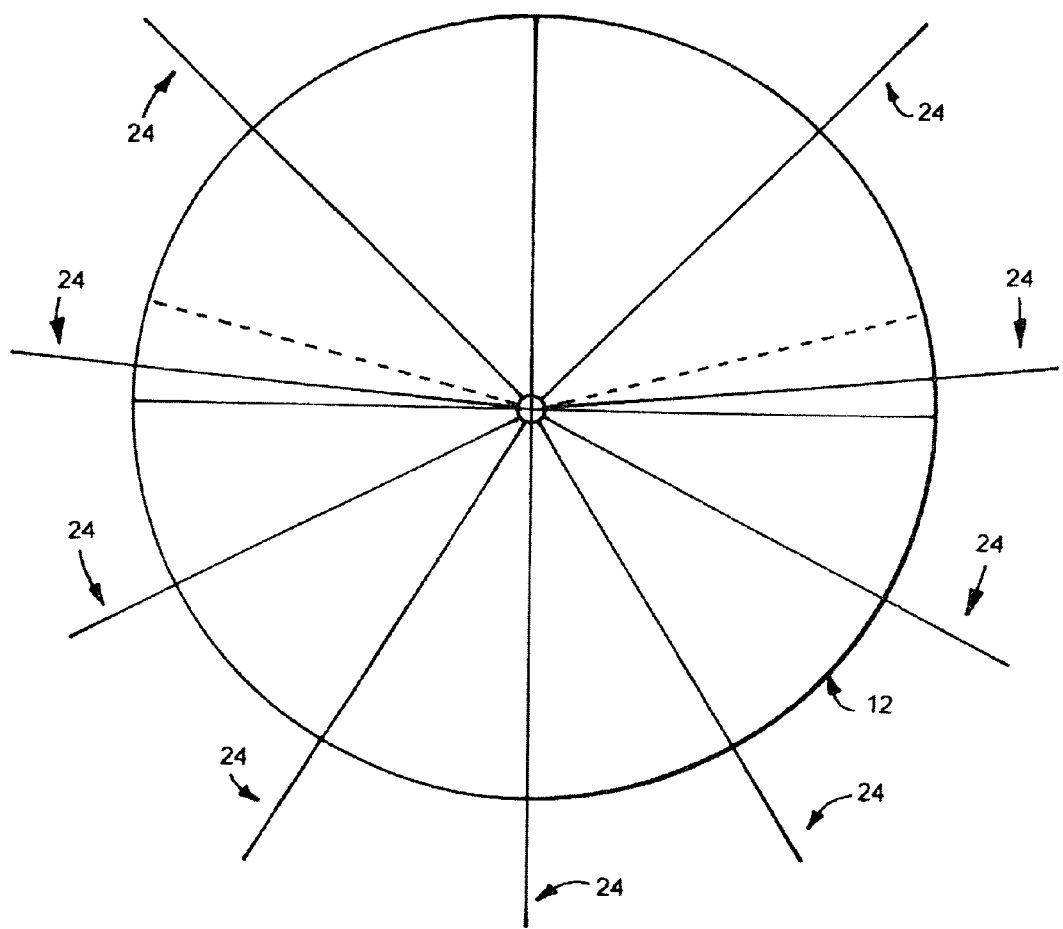
FIG. 5 is a top plan view illustrating the inflatable airfoil of the airfoil wing system, constructed in accordance with the present invention, with the placement of the harness lines indicated thereon.

In addition, the airfoil wing 14 of the airfoil wing system 10 of the present invention has a tailing edge 20 formed by the last wing panels 2c, 3c, 4b, 5b, 6c, 7c in each of the columns 2-7. Along the tailing edge 20 there are a plurality of harness line securement points 22. As best illustrated in FIGS. 4 and 5, the harness line securement points 22 allow securement of the harness lines 24 for tethering the inflatable airfoil 12. It should be noted that the securement of harness lines 24 as illustrated are merely one manner and other manners of securement are within the scope of the present invention.

The airfoil wing 14 of the airfoil wing system 10 of the present invention allows automatic release of air from the airfoil wing 14 to stabilize the inflatable airfoil 12 during flight and assist the user in bringing the inflatable airfoil 12 to the ground. During no wind or light wind conditions, the openings 16 will remain in a closed or substantially closed position. As wind velocities increase, the openings 16 automatically open with the amount of opening depending on the wind velocity. During high wind conditions, the openings 16 will open to their maximum extent. In sum, the airfoil wing system 10 assists the user in maintaining control of the inflatable airfoil 12 during flight and allows the user to bring the inflatable airfoil 12 to the ground in a safe and efficient manner.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. An airfoil wing system for releasing air from an airfoil wing for an inflatable airfoil, the airfoil wing system comprising:
   securing means directly attach the airfoil wing to the inflatable airfoil;
   at least two wing panels connected together;
   a harness line secured to at least one of the wing panels; and
   a horizontal opening formed between the two wing panels;
   wherein tension on the harness line increases air pressure against the wing panels causing the horizontal opening to automatically move from a closed position to an open position to release air from beneath the airfoil wing thereby allowing takedown of the inflatable airfoil.

2. The airfoil wing system of claim 1 and further comprising:
   a plurality of wing panels divided into a plurality of vertical columns and a plurality of horizontal rows, each adjacent wing panel connected to each other adjacent wing panel; and
   a plurality of horizontal and vertical openings, each opening formed between two adjacent wing panels.

3. The airfoil wing system of claim 2 wherein each opening extends along the entire length of the connection between the wing panels.

4. The airfoil wing system of claim 2 and further comprising:
   eighteen wing panels divided into eight columns and three rows;
   wherein the first column has one wing panel, the second column has three wing panels, the third column has three wing panels, the fourth column having two wing panels, the fifth column has two wing panels, the sixth column has three wing panels, the seventh column has three wing panels, and the eighth column has one wing panel; and
   wherein the first row has eight wing panels, the second row has six wing panels, and the third row has four wing panels.

5. The airfoil wing system of claim 4 and further comprising:
   six openings formed in the airfoil wing between adjacent wing panels.

6. The airfoil wing system of claim 5 and further comprising:
   a first horizontal opening formed in the first column between the second row and the third row;
   a second vertical opening formed in the first row between the second column and the third column;
   a third horizontal opening formed in the fourth column between the first row and the second row;
   a fourth horizontal opening formed in the fifth column between the first row and the second row;
   a fifth vertical opening formed in the first row between the sixth column and the seventh column; and
   a sixth horizontal opening formed in the seventh column between the second row and the third row.

7. The airfoil wing system of claim 4 wherein each of the wing panels in the first column and the eighth column is triangular.

8. The airfoil wing system of claim 4 wherein at least one of the wing panels in the third column and sixth column is triangular.

9. The airfoil wing system of claim 4 and further comprising:
   a linear connecting edge formed by the connection of wing panels in the first row;
   wherein the connecting edge is secured to the inflatable airfoil.

10. The airfoil wing system of claim 4 and further comprising:
    a tailing edge formed by the last wing panels in each of the second column, the third column, the fourth column, the fifth column, the sixth column, and the seventh column; and
    a plurality of harness line securement points along the tailing edge;
    the harness line secured to each of the harness line securement points.

11. An airfoil wing system for releasing air from an airfoil wing for an inflatable airfoil, the airfoil wing secured to the inflatable airfoil, the airfoil wing system comprising:
    a plurality of wing panels divided into a plurality of vertical columns and a plurality of horizontal rows, each adjacent wing panel connected to each other adjacent wing panel; and
    a plurality of horizontal and vertical openings, each opening formed between two adjacent wing panels and extending along the entire length of the connection between the wing panels;
    wherein at least each of the horizontal openings automatically moves from a closed position to an open position to release air from beneath the airfoil wing thereby allowing takedown of the inflatable airfoil.

12. The airfoil wing system of claim 11 and further comprising:

eighteen wing panels divided into eight columns and three rows;

wherein the first column has one wing panel, the second column has three wing panels, the third column has three wing panels, the fourth column having two wing panels, the fifth column has two wing panels, the sixth column has three wing panels, the seventh column has three wing panels, and the eighth column has one wing panel; and wherein the first row has eight wing panels, the second row has six wing panels, and the third row has four wing panels.

13. The airfoil wing system of claim 12 and further comprising:

six openings formed in the airfoil wing between adjacent wing panels;

wherein a first opening is formed in the first column between the second row and the third row, a second opening is formed in the first row between the second column and the third column, a third opening is formed in the fourth column between the first row and the second row, a fourth opening is formed in the fifth column between the first row and the second row, a fifth opening formed in the first row between the sixth column and the seventh column, and a sixth opening formed in the seventh column between the second row and the third row.

14. The airfoil wing system of claim 12 and further comprising:

a linear connecting edge formed by the connection of wing panels in the first row;

wherein the connecting edge is secured to the inflatable airfoil.

15. The airfoil wing system of claim 12 and further comprising:

a tailing edge formed by the last wing panels in each of the second column, the third column, the fourth column, the fifth column, the sixth column, and the seventh column;

a plurality of harness line securement points along the tailing edge; and a harness line secured to each of the harness line securement points.

16. A method for releasing air from an airfoil wing for an inflatable airfoil, the airfoil wing secured to the inflatable airfoil, the method comprising:

providing a plurality of wing panels;

dividing the wing panels into a plurality of vertical columns and a plurality of horizontal rows;

connecting each adjacent wing panel to each other adjacent wing panel;

forming a plurality of horizontal and vertical openings;

forming each opening between two adjacent wing panels;

extending each opening along the entire length of the connection between the wing panels;

moving each at least each horizontal opening from a closed position to an open position; and releasing air from beneath the airfoil wing.

17. The method of claim 16 and further comprising:

providing eighteen wing panels; and dividing the wing panels into eight columns and three rows;

wherein the first column has one wing panel, the second column has three wing panels, the third column has three wing panels, the fourth column having two wing panels, the fifth column has two wing panels, the sixth column has three wing panels, the seventh column has three wing panels, and the eighth column has one wing panel; and wherein the first row has eight wing panels, the second row has six wing panels, and the third row has four wing panels.

18. The method of claim 17 and further comprising:

forming six openings in the airfoil wing between adjacent wing panels;

wherein a first opening is formed in the first column between the second row and the third row, a second opening is formed in the first row between the second column and the third column, a third opening is formed in the fourth column between the first row and the second row, a fourth opening is formed in the fifth column between the first row and the second row, a fifth opening formed in the first row between the sixth column and the seventh column, and a sixth opening formed in the seventh column between the second row and the third row.

19. The method of claim 17 and further comprising:

forming a linear connecting edge by the connection of wing panels in the first row; and securing the connecting edge to the inflatable airfoil.

20. The method of claim 17 and further comprising:

creating a tailing edge with the last wing panels in each of the second column, the third column, the fourth column, the fifth column, the sixth column, and the seventh column;

forming a plurality of harness line securement points along the tailing edge; and securing a harness line to each of the harness line securement points.

* * * * *